United States Patent
Bøjer et al.

(10) Patent No.: US 11,349,217 B2
(45) Date of Patent: May 31, 2022

(54) METHOD FOR INTEGRATING ANTENNAS FABRICATED USING PLANAR PROCESSES

(71) Applicant: wiSpry, Inc., Irvine, CA (US)

(72) Inventors: Jørgen Bøjer, Vadum (DK); Mikkel Baumann-Jorgensen, Aalborg (DK); Brian Skjold Bertelsen, Vadum (DK); Ulrik Riis Madsen, Aalborg (DK); Mathias Zacho Vestergaard, Terndrup (DK); Arthur S. Morris, III, Lakewood, CO (US)

(73) Assignee: WISPRY, INC., Irvine, CA (US)

( * ) Notice: Subject to any disclaimer, the term of this patent is extended or adjusted under 35 U.S.C. 154(b) by 0 days.

(21) Appl. No.: 16/752,547

(22) Filed: Jan. 24, 2020

(65) Prior Publication Data

US 2020/0243958 A1     Jul. 30, 2020

Related U.S. Application Data

(60) Provisional application No. 62/796,390, filed on Jan. 24, 2019.

(51) Int. Cl.
  *H01Q 9/30*     (2006.01)
  *H01Q 9/40*     (2006.01)
  (Continued)

(52) U.S. Cl.
  CPC .................. *H01Q 9/40* (2013.01); *H01Q 1/38* (2013.01); *H01Q 1/48* (2013.01); *H01Q 3/22* (2013.01);
  (Continued)

(58) Field of Classification Search
  CPC .... H01Q 19/104; H01Q 19/106; H01Q 19/13; H01Q 19/32; H01Q 1/243; H01Q 1/38;
  (Continued)

(56) References Cited

U.S. PATENT DOCUMENTS

| 4,867,704 A | 9/1989 | Standke |
| 6,344,833 B1 | 2/2002 | Lin et al. |
| (Continued) | | |

FOREIGN PATENT DOCUMENTS

| JP | H 08 023220 A | 1/1996 |
| JP | 2003 347841 A | 12/2003 |
| (Continued) | | |

OTHER PUBLICATIONS

International Search Report and Written Opinion for Application No. PCT/US2020/015097 dated May 20, 2020.
(Continued)

*Primary Examiner* — Thien M Le
(74) *Attorney, Agent, or Firm* — Jenkins, Wilson, Taylor & Hunt, P.A.

(57) ABSTRACT

Methods and devices for integrating antennas fabricated using planar laminate processes. The method includes laminating one or more conductive layers to a first dielectric material layer, forming one or more holes through at least the first dielectric material layer, forming a monopole antenna through at least a first of the holes, attaching one or more integrated circuit dies to one of the conductive layer, and connecting the integrated circuit dies to the monopole antenna. The device can include a planar laminate integrated circuit module including one or more dielectric material layers, one or more integrated circuit die on a surface of or attached to the planar laminate integrated circuit module, and an integrated monopole antenna interfaced with the integrated circuit dies. The integrated monopole antenna is formed in a through hole of the planar laminate integrated circuit module, the through hole being formed through at least one of the dielectric material layers.

26 Claims, 7 Drawing Sheets

(51) Int. Cl.
- *H01Q 1/48* (2006.01)
- *H01Q 19/13* (2006.01)
- *H01Q 3/22* (2006.01)
- *H01Q 3/26* (2006.01)
- *H01Q 19/10* (2006.01)
- *H04B 7/06* (2006.01)
- *H01Q 1/38* (2006.01)
- *H01Q 9/04* (2006.01)

(52) U.S. Cl.
CPC ......... *H01Q 3/2617* (2013.01); *H01Q 9/0407* (2013.01); *H01Q 9/30* (2013.01); *H01Q 19/104* (2013.01); *H01Q 19/13* (2013.01); *H04B 7/0617* (2013.01)

(58) Field of Classification Search
CPC .......... H01Q 1/48; H01Q 3/22; H01Q 3/2617; H01Q 3/44; H01Q 9/0407; H01Q 9/30; H01Q 9/40; H04B 7/061
See application file for complete search history.

(56) References Cited

U.S. PATENT DOCUMENTS

| | | | |
|---|---|---|---|
| 7,038,626 | B2 | 5/2006 | Gothard et al. |
| 7,683,837 | B2 | 3/2010 | Noro |
| 10,084,241 | B1 | 9/2018 | Jenwatanavet et al. |
| 2003/0184492 | A1 | 10/2003 | Chiang et al. |
| 2003/0193446 | A1 | 10/2003 | Chen |
| 2004/0150568 | A1 | 8/2004 | Chiang et al. |
| 2005/0024267 | A1 | 2/2005 | Jouvie et al. |
| 2005/0122265 | A1 | 6/2005 | Gaucher et al. |
| 2005/0237258 | A1 | 10/2005 | Abramov et al. |
| 2006/0033664 | A1* | 2/2006 | Soler Castany ......... H01Q 1/36 343/700 MS |
| 2006/0256015 | A1 | 11/2006 | Park et al. |
| 2007/0132654 | A1 | 6/2007 | Ozkar |
| 2007/0194995 | A1 | 8/2007 | Fang et al. |
| 2010/0141530 | A1 | 6/2010 | McMahon |
| 2013/0162496 | A1 | 6/2013 | Wakabayashi |
| 2014/0071013 | A1 | 3/2014 | Shtrom et al. |
| 2017/0292920 | A1 | 10/2017 | Torun et al. |
| 2017/0294705 | A1 | 10/2017 | Khripkov et al. |
| 2018/0100945 | A1 | 4/2018 | Ewe et al. |
| 2018/0219275 | A1 | 8/2018 | Deng et al. |
| 2018/0226367 | A1* | 8/2018 | Babcock ............... H04B 1/0475 |
| 2018/0248254 | A1 | 8/2018 | Islam et al. |
| 2019/0027804 | A1* | 1/2019 | Kim .................. H01Q 21/0025 |
| 2019/0103365 | A1* | 4/2019 | Singh ...................... H01L 25/16 |
| 2019/0139912 | A1* | 5/2019 | Kim .................... H01L 23/3114 |
| 2019/0173184 | A1* | 6/2019 | Kim ...................... H01Q 9/0407 |
| 2019/0333882 | A1* | 10/2019 | Kamgaing .......... H01Q 19/005 |
| 2020/0027425 | A1 | 1/2020 | Lee et al. |
| 2020/0243978 | A1 | 7/2020 | Bøjer et al. |
| 2020/0244327 | A1 | 7/2020 | Bøjer et al. |

FOREIGN PATENT DOCUMENTS

| | | |
|---|---|---|
| JP | 2008 066979 A | 3/2008 |
| JP | 2008 306466 A | 12/2008 |
| JP | 2012 090251 A | 5/2012 |
| KR | 2002 0013998 A | 2/2002 |
| WO | WO 2018119153 A2 | 6/2018 |
| WO | WO 2020/154650 A1 | 7/2020 |
| WO | WO 2020/154667 A1 | 7/2020 |
| WO | WO 2020/154695 A1 | 7/2020 |

OTHER PUBLICATIONS

International Search Report and Written Opinion for Application No. PCT/US2020/015061 dated May 25, 2020.
Non-Final Office Action for U.S. Appl. No. 16/752,409 dated May 12, 2021.
Final Office Action for U.S. Appl. No. 16/572,409 dated Dec. 16, 2021.
International Search Report and Written Opinion for Application No. PCT/US2020/015036 dated May 26, 2020.
Non-Final Office Action for U.S. Appl. No. 16/752,268 dated Oct. 5, 2021.

* cited by examiner

METHOD FOR INTEGRATING ANTENNAS FABRICATED USING PLANAR PROCESSES

CROSS-REFERENCE TO RELATED APPLICATIONS

The present application claims priority to U.S. Provisional Patent Application Ser. No. 62/796,390, filed Jan. 24, 2019, the entire disclosure of which is incorporated by reference herein. This application also relates to U.S. patent application Ser. No. 16/752,268, entitled SYSTEMS AND METHODS FOR VIRTUAL GROUND EXTENSION FOR MONOPOLE ANTENNA WITH A FINITE GROUND PLANE USING A WEDGE SHAPE and Ser. No. 16/752,409, entitled SPHERICAL COVERAGE ANTENNA SYSTEMS, DEVICES, AND METHODS commonly owned and filed on Jan. 24, 2020, both of which also claim priority to U.S. Provisional Patent Application Ser. No. 62/796,390, filed Jan. 24, 2019, the contents of all applications identified above which are incorporated by reference herein.

TECHNICAL FIELD

The subject matter disclosed herein relates generally to monopole antenna fabrication for mobile devices. More particularly, the subject matter disclosed herein relates to integrated monopole antenna fabrication for mobile devices using planar laminate processes.

BACKGROUND

Some fifth generation (5G) wireless technologies operate at frequencies between and including about 20 GHz and 95 GHz, frequencies within the millimeter wave (mmWave) band of radio frequencies. In the manufacturing of millimeter wave antennas the fabrication process plays a significant role due to the small dimensions. Mechanical tooling like drilling/routing or mechanical extrusion or bending is very challenging on small antennas. Also, it is challenging (and may prove costly) to interconnect between the small antenna and a transmitter and or or receiver circuit. Moreover, traditional methods of including antennas with fabricated modules can be quite costly and make scaling manufacturing of the modules with antennas quite difficult. Thus, a new method of fabricating the modules with accompanying antennas is needed to solve scalability issues and cost concerns.

Planar fabrication processes, as used in the manufacturing of printed circuit boards, thin film structures, and monolithic integrated circuits have proven to be a highly accurate and low cost fabrication process.

SUMMARY

The subject matter presented in this disclosure provides a method of fabricating an antenna and its connected transmitter and/or receiver circuit into one integrated module using planar fabrication processes. In accordance with this disclosure, methods for fabricating an integrated monopole antenna in a planar laminate module. In one aspect, the method comprises: laminating one or more conductive layers to a first dielectric material layer; forming one or more holes through at least the first dielectric material layer; forming a monopole antenna through at least a first of the one or more holes; attaching one or more integrated circuit dies to one of the one or more conductive layers; and connecting the one or more integrated circuit dies to the monopole antenna.

Furthermore, in some embodiments, the method further comprises etching one or more patterns into the one or more conductive layers. In some further embodiments, the method comprises laminating one or more outer dielectric material layers onto and around a surface of the one or more conductive layers on the first dielectric material layer. In some embodiments, forming the one or more holes comprises: etching and patterning a top layer of the planar laminate module to form one or more annular rings, each having a diameter that is greater than a diameter of the monopole antenna; and drilling a hole through each of the one or more annular rings to a desired depth in the planar laminate module.

In some embodiments, a length of the monopole antenna is equal to about one-quarter of a wavelength of a desired operating or resonance frequency of the monopole antenna. In some embodiments, the method further comprises positioning a reflector near the monopole antenna, the reflector being configured to reflect radiation emitted from the monopole antenna. In some embodiments, the method further comprises drilling a slot configured such that the reflector can be in the slot.

In some embodiments, the method further comprises machining a cavity in the planar laminate module configured such that the one or more integrated circuit dies can be integrated to the planar laminate module. In some embodiments, the monopole antenna is connected to radio circuitry in the one or more integrated circuit dies. In some further embodiments, the radio circuitry includes circuitry configured to tune the monopole antenna to operate at different frequencies or different frequency bands.

In accordance with this disclosure, a planar laminate integrated circuit module is disclosed. In some embodiments, the planar laminate integrated circuit module comprises: one or more dielectric material layers; one or more integrated circuit die on a surface of or attached to the planar laminate integrated circuit module; and an integrated monopole antenna interfaced with the one or more integrated circuit dies; wherein the integrated monopole antenna is formed in a through hole of the planar laminate integrated circuit module, the through hole being formed through at least one of the one or more dielectric material layers.

In some embodiments, pads of the one or more integrated circuit dies are wire bonded to pads of the surface of the planar laminate integrated circuit module. In some embodiments, the through hole is plated. In some embodiments, the through hole is plated using electrodes plating. In some embodiments, the through hole comprises a filling material. In some embodiments, the integrated monopole antenna has a dimension that is equal to approximately one-quarter wavelength of an operating or resonating frequency of the integrated monopole antenna. In some embodiments, the integrated monopole antenna is connected to radio circuitry in one of the one or more integrated circuit dies. In some embodiments, the radio circuitry comprises circuitry configured to tune the monopole antenna to operate at different frequencies or different frequency bands. In some embodiments, the planar laminate integrated circuit module further comprises one or more additional integrated antenna elements formed in respective through holes of the planar laminate integrated circuit module. In some embodiments, the one or more additional integrated antenna elements are connected to impedance tuning circuitry or switching elements in one of the one or more integrated circuit dies.

An added benefit of the module of the present disclosure is that it can be integrated with cell phone and sub-6 GHz cellular communication networks.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides methods for, and devices formed by, fabricating an integrated monopole antenna in a planar laminate processed module. In one aspect, the present subject matter provides a method of fabricating an integrated monopole antenna in a planar laminate processed module.

Figure 1A:
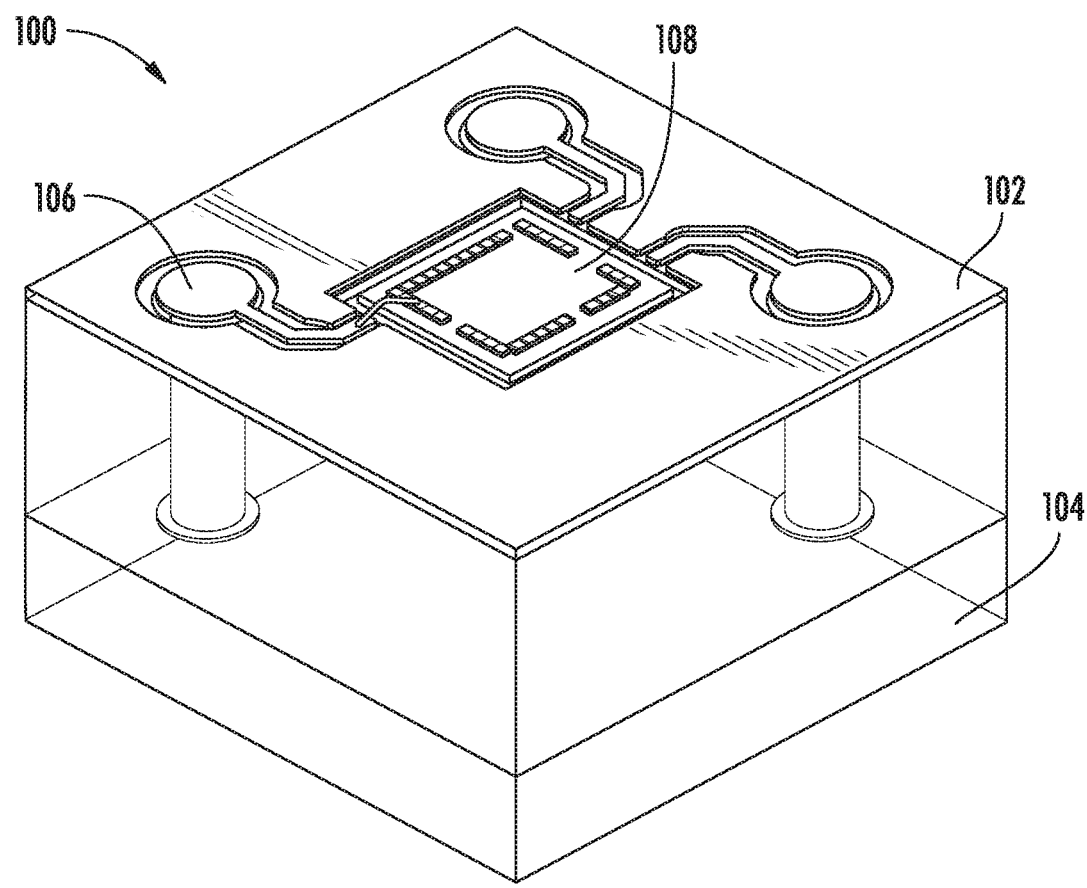
FIG. 1A and FIG. 1B are perspective views of a planar laminate processed integrated circuit module according to an embodiment of the presently disclosed subject matter.
Figure 1B:
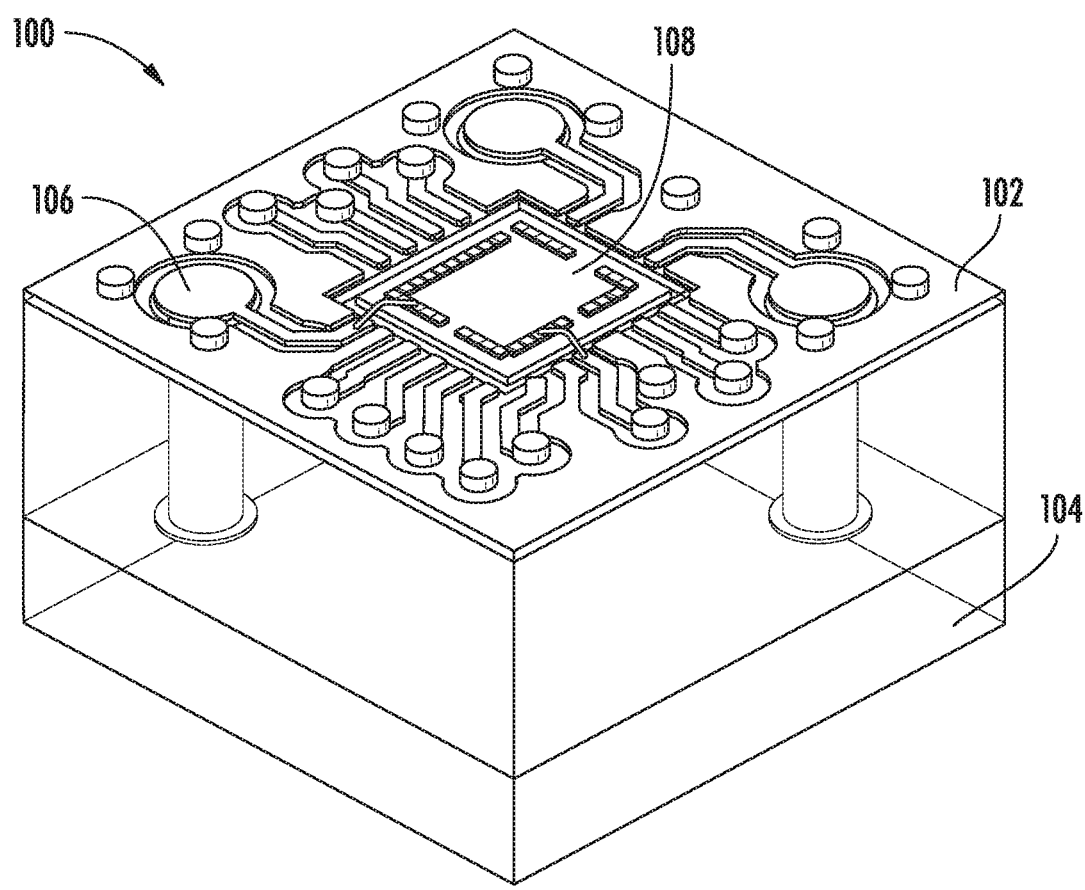

Referring to FIG. 1A, which illustrates a perspective view of an example planar laminate processed module 100 that has been fully fabricated and includes an integrated circuit die 108 and integrated monopole 106 all in the same module. The integrated circuit die 108 is located within a cavity of the top layer 102 and there are multiple dielectric layers below the top layer 102, ending in the bottom layer 104. The process or method for fabricating such an integrated planar laminate processed module 100 is described further herein and can be used to fabricate an integrated module of virtually any shape, size, or complexity. The example integrated planar laminate processed module 100 illustrated in FIG. 1B, which is a more detailed example implementation of the module shown in FIG. 1A includes the top layer 102 and the bottom layer 104 as well. The top layer 102, in this implementation, includes connections between the integrated monopole 106 and the integrated circuit die 108 as well as various other components of the module to the integrated circuit die 108. As will be described further hereinbelow, the process or method for fabricating the planar laminate processed module 100 involves layering various materials on top of each other, forming a hole in which to plate the integrated monopole 106, and then plating the integrated monopole 106. The process described herein makes for a cheaper, more scalable module than traditional methods and allows for the monopole to be integrated within the layers of the module.

Figure 2A:
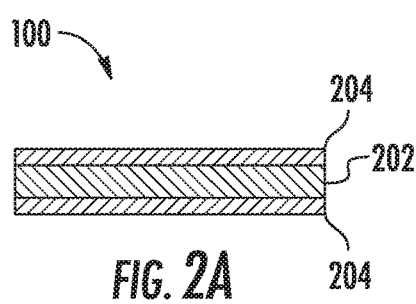
FIG. 2A, FIG. 2B, FIG. 2C, FIG. 2D, FIG. 2E, FIG. 2F, and FIG. 2G, each illustrate various stages of the integrated circuit module as it is fabricated using the method according to an embodiment of the presently disclosed subject matter.

Referring next to FIG. 2A-FIG. 2G, which illustrate visual interpretations of the steps taken in the process for fabricating the planar laminate processed module 100 of the present disclosure. In some embodiments of the present disclosure, as shown in FIG. 2A, the first step in the process comprises laminating conductive foil 204 to a core dielectric material 202. In some embodiments, the conductive foil 204 can comprise copper, aluminum, silver, or any other suitable conductive material. In some embodiments, the core dielectric material 202 can comprise any suitable dielectric material known to those having ordinary skill in the art. For example and without limitation, in some embodiments, the core dielectric material 202 can comprise TU-768, a woven E-glass coated with an epoxy resin system. In some other embodiments, the core dielectric material 202 can comprise, for example and without limitation, a Panasonic® R-5775 CS1035 Megtron6 laminate glass cloth.

Figure 2B:
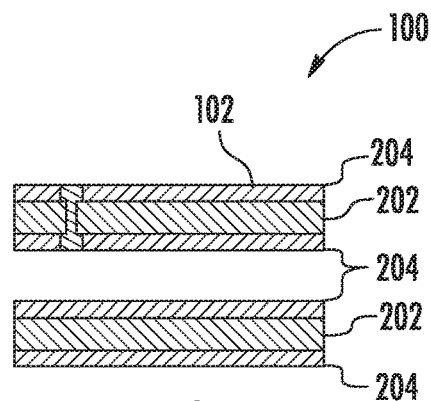

Next, as illustrated by FIG. 2B, in some embodiments, one or more other core dielectric layers 202 can be laminated with a conductive foil 204 and the final laminate layer will include the top layer 102. This process can be repeated, as needed, until the desired thickness from the integrated monopole 106 end to the selected ground plane is achieved (i.e., approximately one-quarter (i.e., ¼) of a wavelength of an operating or resonating frequency of the integrated monopole 106) and until the required interconnect layers have been processed. In some embodiments, the operating or resonance frequency of the integrated monopole 106 can be between and including about 20 GHz and 95 GHz.

As a hypothetical example, given a radio wave at a frequency of about 28 GHz and the module 100 surrounding the integrated monopole 106 having a relative permittivity of $\varepsilon_r=3$, the wavelength ($\lambda$) of the signal would be about 6.18 mm.

$$\lambda = v/f$$

v=velocity of the radio signal, f=frequency $$v = c/\sqrt{\varepsilon}$$

c=speed of light through vacuum (i.e. 2.998×10$^8$ m/s); and $\varepsilon$ is the relative permittivity of the medium $$v = (2.998 \times 10^8)/\sqrt{3} = 1.7308 \times 10^8 \text{ m/s}$$

$$\lambda = (1.7308 \times 10^8 \text{ m/s})/28 \times 10^9 \text{ Hz}$$

$$\lambda = 6.18 \text{ mm}$$

Throughout the remainder of the description herein, the hypothetical described above will be used to demonstrate the wavelength values of the dimensions of some of the devices described herein. However, those having ordinary skill in the art will appreciate that, by changing the medium surrounding the monopole (i.e. to free space or a medium having a relative permittivity of $\varepsilon_r=1$) the adjusted wavelength, and thus the length of the monopole, will change according to the formulations described above.

Those having ordinary skill in the art will appreciate that as the relative permittivity of the surrounding space changes, so would the wavelength. Thus, in this hypothetical, the length of the integrated monopole 106, at ¼ wavelength, would be about 1.5 mm (i.e., 0.25*6.18 mm). In some embodiments, the layer that includes the top layer 102 can be etched and patterned to include an annular ring, where a hole for the integrated monopole 106 can be drilled or otherwise formed, wherein the annular ring is a circular conductive ring on the surface of the top layer 102 that has a diameter that is greater than the planned diameter of the hole for the integrated monopole 106. Those having ordinary skill in the art will appreciate that adding the annular ring will increase the effective length of the integrated monopole 106 so that the integrated monopole 106 can be shorter for a given frequency of operation.

Figure 2C:
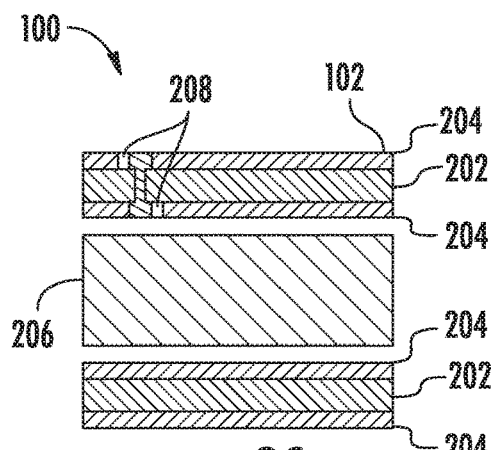

As illustrated in FIG. 2C, in some embodiments, the laminated core layers 202 can be separated by a reinforcing fabric that has been pre-impregnated with a resin system, i.e., prepreg layer 206. The prepreg layer 206 can comprise any suitable prepreg material known to those having ordinary skill in the art. For example and without limitation, in some embodiments, the prepreg layer 206 can comprise TU-768P, similar to the material of the core 202. In some further embodiments, the prepreg layer 206 can comprise, for example and without limitation, Panasonic® R-5670 CS2116 Megtron6, and other materials incorporating glass cloth.

In some embodiments, the conductive foil 204 will need to be etched away so as to allow the integrated monopole 106 to operate properly. For example, as indicated in FIG. 2C, parts of the top layer 102 conductive foil and the next conductive foil layer 204 underneath the top layer 102 can be etched to form an air gap 208.

Figure 2D:
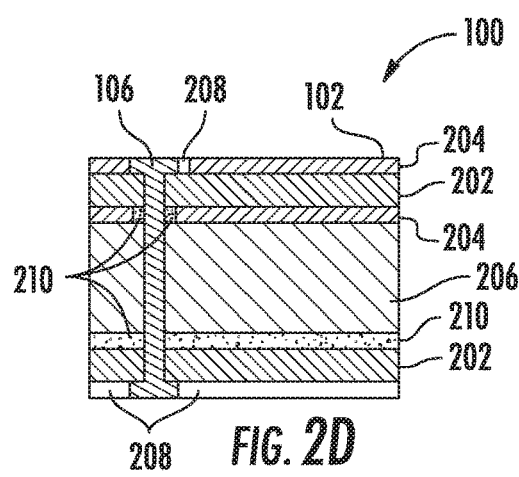

Referring next to FIG. 2D, in some embodiments, a hole defining the diameter and location of the integrated monopole can be formed through the various layers, including the core dielectric material layers 202 and the prepreg layer 206, via drilling or other suitable method. The hole is formed (i.e., drilled, etc.) through the annular ring. Once the hole has been formed, in some embodiments, the integrated monopole 106 is plated. During the plating process, the inner surface of the hole is plated using a plating process, such as, for example and without limitation, electroless plating.

Following the plating process a mechanical hole is left behind that is the center of the integrated monopole 106. In some embodiments, the mechanical hole can be filled with a filling material (i.e., an underfill) configured to help absorb mechanical stress from solder connections. If the mechanical hole is not filled prior to mounting the module, an air cavity will remain in the module encapsulated by the underfill material. An air cavity can stress the connection as the air (or air and moisture) will expand during heating. Alternatively, a hole near a solder connection can make the solder connection unreliable if solder material floods into the hole. In some embodiments, dielectric loading of the integrated monopole 106 is required, in which case, a layer of dielectric (i.e., a dielectric loading layer) can be laminated over the monopole end side of the integrated monopole 106.

As described above with respect to FIG. 2C, in some embodiments, the conductive foil layers 204 will need to be etched. The outer layers such as the top layer 102 and the bottom layer 104 can be etched to form air gaps 208. However, in some embodiments, the inner conductive foil layers need to be etched and filled with resin 210 such as, for example an epoxy.

Figure 2E:
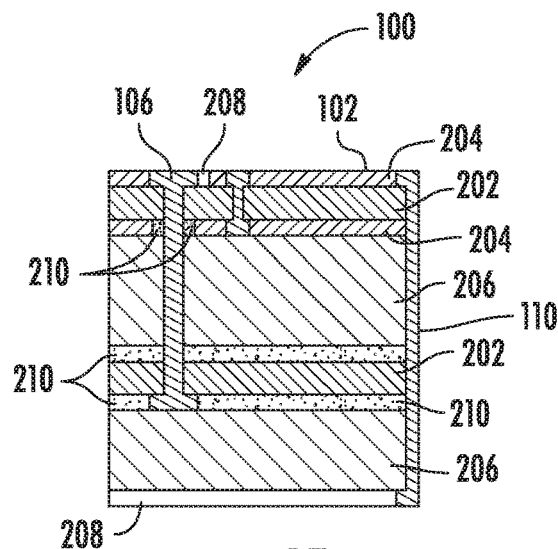

As illustrated in FIG. 2E, in some embodiments, an additional prepreg layer can be added to the planar laminate processed module 100 on a side opposite the top layer 102. The bottom of the additional prepreg layer can be laminated and act as a bottom layer 104 of the module 100. In some embodiments, the integrated monopole 106 requires a reflector, or it is ideal for the design of the integrated monopole 106 to have a reflector. Thus, in some embodiments, a slot may be drilled or formed in the planar laminate processed module 100 for the reflector 110. In some embodiments, one side of the slot will resemble the location and pattern of the intended reflector 110. In some embodiments, the slot for the reflector 110 can be formed by drilling for the reflector similar to how the hole for the monopole 106 was formed. For monopoles requiring a reflector having the same height as the integrated monopole antenna 106, drilling or forming the slot for the reflector can be performed at the same time as the hole is drilled for the integrated monopole antenna 106. In some further embodiments, once the slot has been formed for the reflector 110, the reflector 110 can then be plated by using, for example and without limitation, an edge plating process.

Although the above embodiments illustrate a core dielectric layer 202 as the layer of the module 100 where the top copper foil layer is placed, those having ordinary skill in the art will appreciate that although core dielectric layers 202 and prepreg layers 206 are shown in this particular figure, the dielectric layers used in this procedure could be either core dielectric layers or prepreg layers or any other suitable dielectric layer. With that being said the core layers 202 will have much tighter thickness tolerances and thus, should be used for critical vertical dimensions. Any valid PCB sequence is acceptable, the key is to ensure the appropriate thickness for the monopole antenna 106. The exact sequence in which the prepreg 206 or core layers 202 are layered is also not as important, the key is to use a mixture of dielectric layers to achieve the desired thickness based on the most efficient way to build the module 100.

As described above with respect to FIG. 2D, in some embodiments, the conductive foil layers 204 will need to be etched. The outer layers such as the top layer 102 and the bottom layer 104 can be etched to form air gaps 208. However, the inner conductive foil layers need to be etched and filled with resin 210 such as, for example an epoxy.

It should be noted that the subject matter of the present disclosure is configured such that the inner-shield layer (i.e., the core dielectric layer 202 closest to the top layer 102) in FIG. 2E gives an un-broken ground plane because a feed connection could be put in other layers than ground/shield. In some embodiments, the module 100 can use the inner shield layer to shield from the die 108.

Figure 2F:
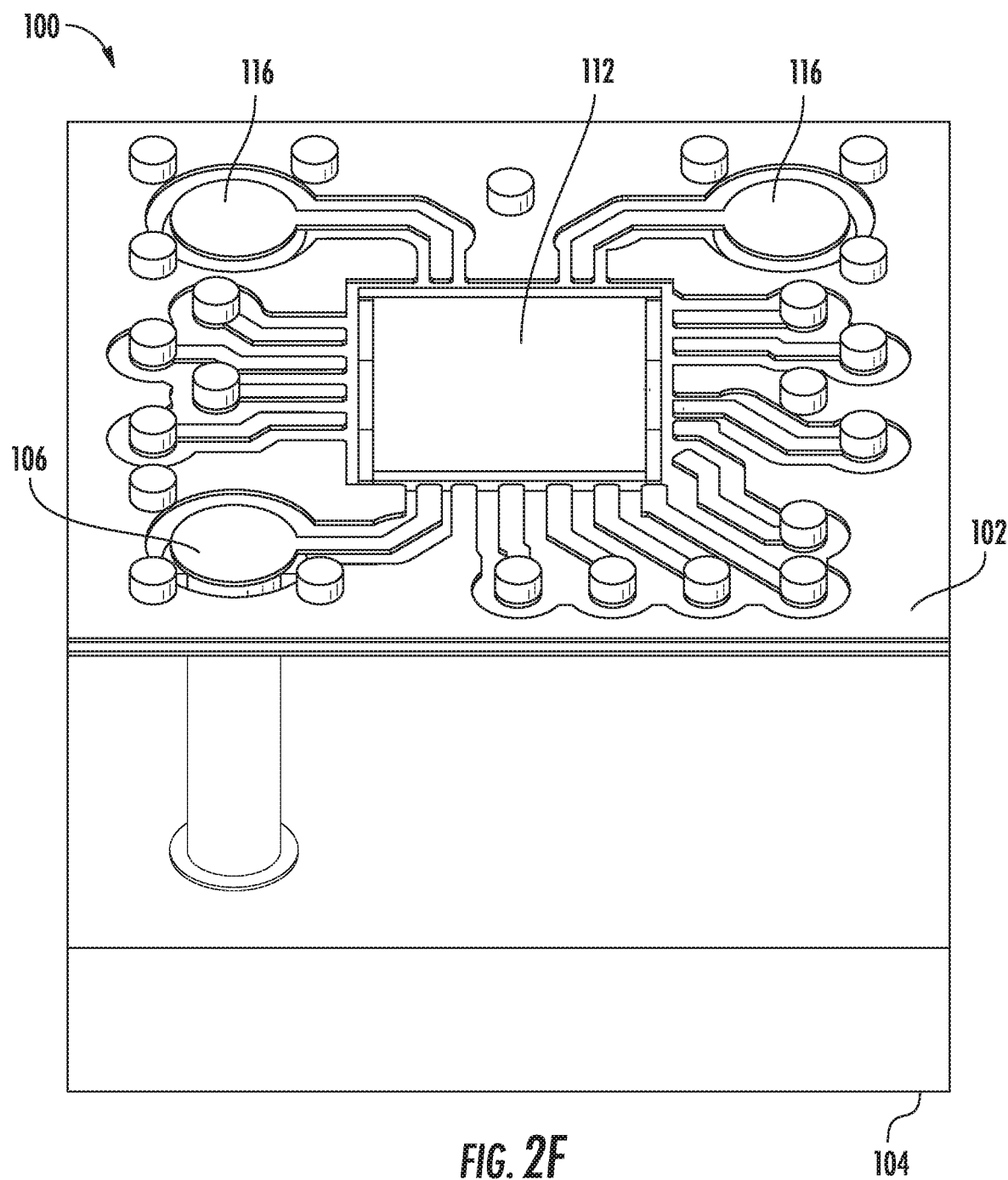

Referring next to FIG. 2F, which illustrates a top perspective view of an example planar laminate processed module 100 of the present disclosure. FIG. 2F depicts the various core 202 and prepreg 206 layers as being transparent here, but this is for illustrative purposes only. As shown in FIG. 2F, in some embodiments, a cavity 112 for an integrated circuit die can be machined into the top layer 102 of the module 100. Additionally, various connections for the module 100 can be etched or patterned on the top layer 102, the connections being formed to connect various components of the module 100 to the integrated circuit die that will be placed where the cavity 112 is machined. Moreover, one or more passive antennas 116 can be formed in the module 100 using some of the same techniques described above for the integrated monopole antenna 106. In some embodiments, the integrated monopole antenna 106 can be connected to radio circuitry in the integrated circuit die 108. The radio circuitry can include circuitry configured to tune the active integrated monopole antenna 106 to operate at different frequencies or different frequency bands. The additional passive antenna elements 116 formed in other holes can be connected to impedance tuning circuitry or switching elements in the integrated circuit die 108. In some embodiments, the impedance tuning circuitry or switching elements can be configured to affect the beam direction.

Figure 2G:
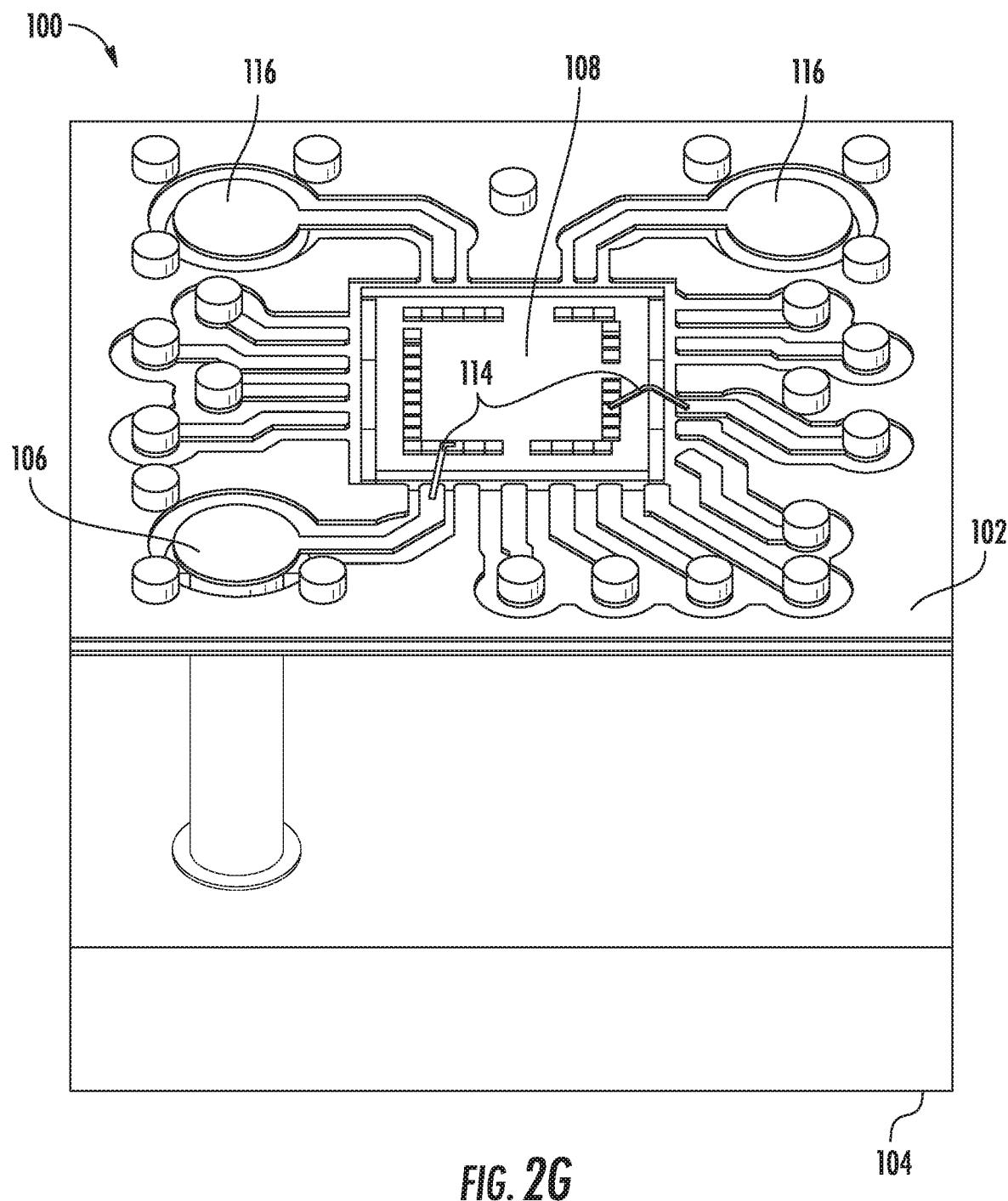

In some embodiments, as shown in FIG. 2G, the integrated circuit die 108 is then placed in the cavity 112 and either wire bonded or casted into or molded together with the module 100. In some embodiments, for example and without limitation, the integrated circuit die 108 can be placed in the cavity 112 and wire bonded. In order to wire bond the integrated circuit die 108 to the module 100, short, wedge-to-wedge wire bonds 114 (i.e., conductive wires) are used to bond the integrated circuit die bond pads of integrated circuit die 108 to the laminate bond pads on the top layer 102. In some embodiments, where wire bonding is used, the laminate bond pads and the die bond pads are at the same level.

In some other embodiments, the integrated circuit die 108 can be casted into or molded together with the module 100. In such an embodiment, the integrated circuit die 108 is placed on the top layer 102 (i.e. on the laminate) or in the cavity 112 and casted or molded into/together with the module 108. From there, conductive traces can be plated between the laminate interconnect traces and the integrated circuit die 108 pads using integrated processes. Those having ordinary skill in the art will appreciate that various other steps in the process can be incorporated into the steps described above. Additionally, those having ordinary skill in the art will appreciate that the integration of the chip can be performed where the chip is "flip-chipped" onto/into the module or where the module is formed around an embedded chip. In some other embodiments, the integration of the chip can be performed using wafer level packaging processes.

Figure 3A:
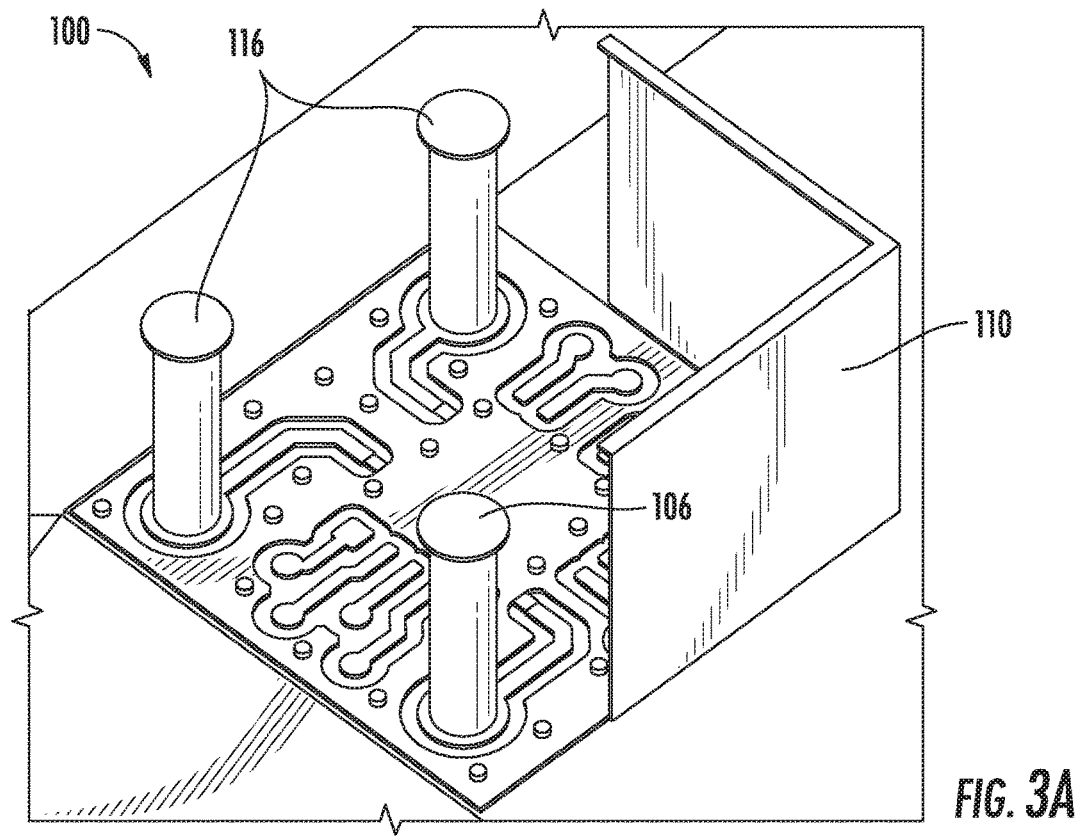
FIG. 3A and FIG. 3B illustrate a bottom perspective view of the integrated circuit module (with the various laminate layers not shown) according to an embodiment of the presently disclosed subject matter.

Referring next to FIG. 3A, which illustrates a bottom view of the top layer 102. Although in this view the various layers (prepreg and core layers) are no longer shown in the drawing, this view should be understood as depicting the under side of the top layer 102 as if the prepreg and core layers were not present for illustrative purposes only. As illustrated in FIG. 3A, the integrated monopole 106 is included, along with passive antennas 116. In some embodiments, the passive antennas 116 can be used to steer the radiation pattern of the integrated monopole 106 using various steering techniques known to those having ordinary skill in the art. Additionally, as shown in the figure, a reflector 110 can be included as described herein. The ultimate purpose of the reflector 110 can vary, depending on the design of the module 100. However, those having ordinary skill in the art will appreciate that some possible implementations of the reflector 110 can include using the reflector 110 to reflect radiation (i.e., radio signals) emanating from the integrated antenna 106 towards the edge of the module 100 (i.e., away from the reflector 110). Those skilled in the art will appreciate that the reciprocity theorem is valid for the antennas and electromagnetic propagation and the receive or transmit scenario are interchangeable scenarios and any mention herein according to a receive or transmit scenario is used for explanatory and example purposes only and should not be construed as limiting the present subject matter in any way.

Figure 3B:
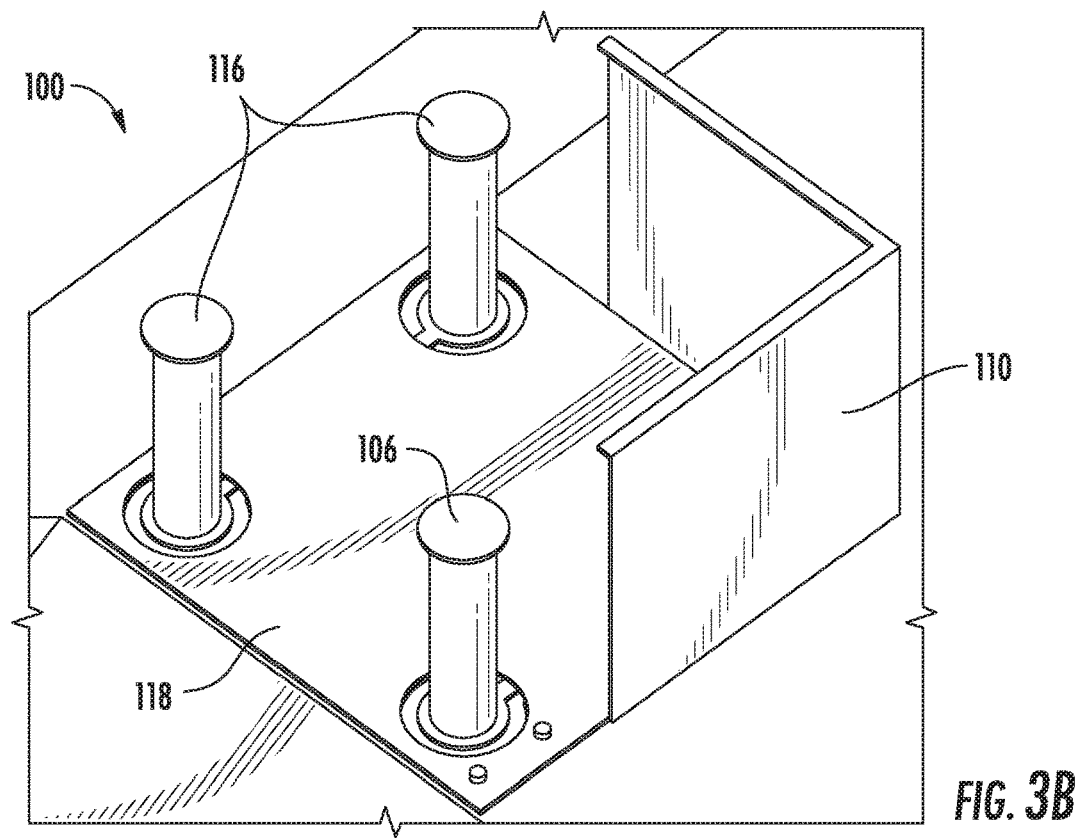

Depending on the aspects and positioning of the reflector 110, it can be used to further steer or direct the radio signals from the integrated antenna 106 away from the reflector 110. Moreover, as shown in FIG. 3B, in some embodiments, a ground shield 118 can be included. The ground shield 118, for example and without limitation can be configured to keep RF out of the control and power interconnects and to keep noise from the power and interconnect out of the RF. In some embodiments, the ground shield 118 can also be used to form part of the RF return path from the main PCB.

Figure 4:
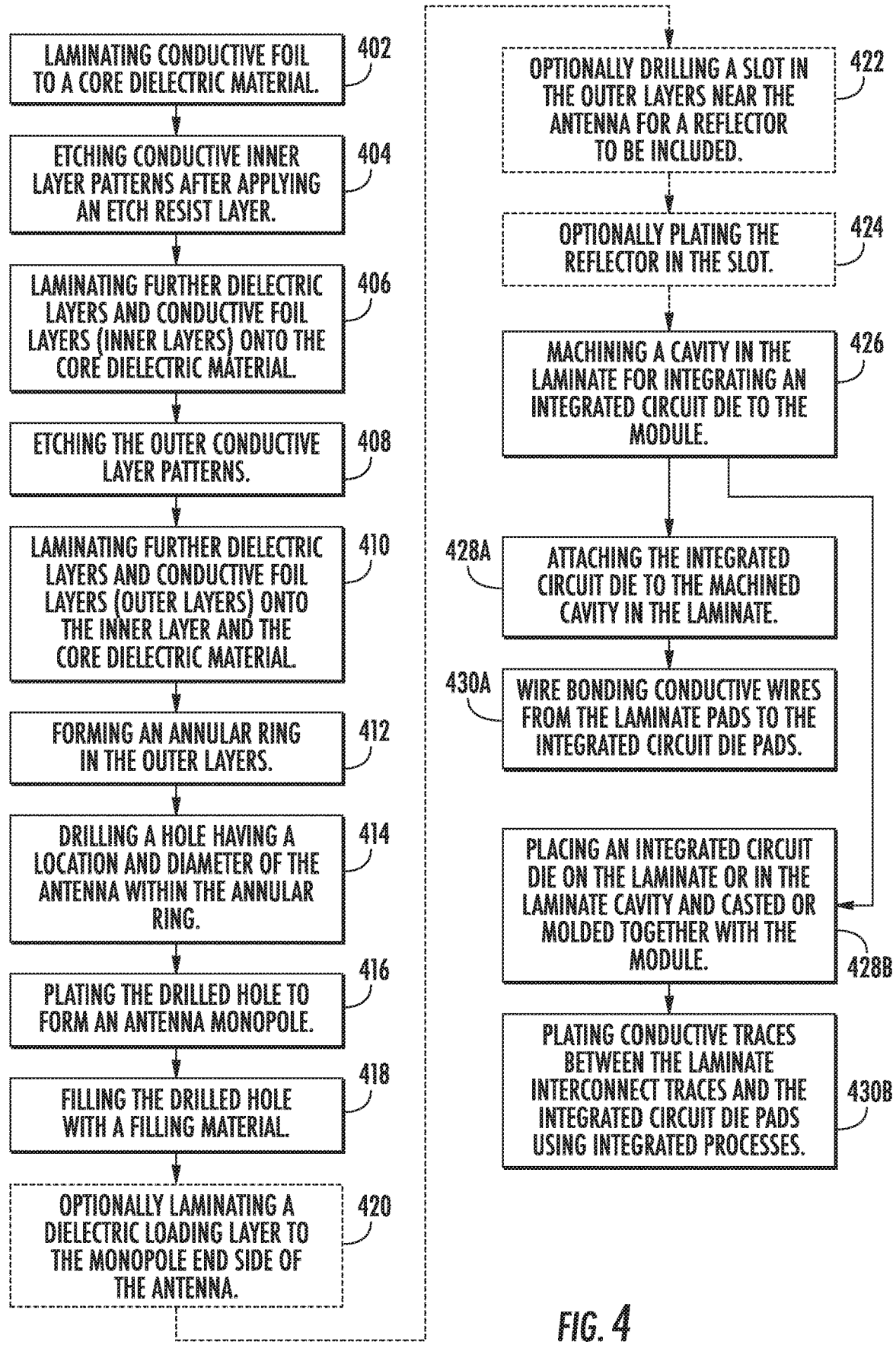
FIG. 4 is a flow chart illustrating steps in the process for fabricating the integrated circuit module according to an embodiment of the presently disclosed subject matter.

Referring next to FIG. 4, which illustrates a flow chart of an example method of fabricating the planar laminate processed module 100 of the present disclosure. In some embodiments, the first step 402 in the process of the present disclosure comprises laminating one or more conductive foil (i.e. conductive layer(s)) to a core dielectric material. In some embodiments, the second step 404 in the process of the present disclosure comprises etching conductive inner layer (s) patterns after applying an etch resist layer (i.e., which can be a temporary etch resist layer) applied through stencil photo resist or direct (ink-jet) printing techniques or similar. In some embodiments, the second step 404 comprises etching one or more patterns into the one or more conductive layers. In some embodiments, the inner layer can be used as a ground plane reference for the monopole antenna that will later be integrated into the module. In some embodiments, the ground pattern will have a hole in the area where the integrated monopole antenna cylinder will be drilled later on as described herein. If the inner layer is an interconnect layer to the integrated monopole antenna the layer pattern will have a remaining conductive trace from the antenna towards the transmitter or receive circuit of the antenna.

In some embodiments, the third step 406 in the process comprises laminating further dielectric layers and conductive foil layers (inner layers) onto the core conductive material layers. In some embodiments, the fourth step 408 in the process comprises etching the now outer conductive layer patterns according to previous steps described above. If the inner layer is an interconnect layer to the integrated monopole antenna the layer pattern can have a remaining conductive trace from the antenna towards the transmitter or receiver circuit as well as a ring, such as, for example and without limitation, an annular ring or similar pattern used in the later plating process for the integrated monopole antenna. If the inner layer is used as a ground reference for the integrated monopole antenna the ground pattern will have a hole in the area where the antenna cylinder can be drilled. In some embodiments, the fifth step 410 in the process comprises laminating further dielectric layers and conductive foil layers (outer layers) onto and around a surface of the inner layers and the core dielectric material layers until the desired thickness from the integrated antenna monopole end to the selected ground plane is achieved. In some embodiments, the length of the monopole can be about a quarter wavelength of an operating or resonating frequency of the integrated monopole antenna.

For example and without limitation, the hypothetical described above, where the operating frequency of the monopole antenna is about 28 GHz, the desired length of the monopole antenna would be about 1.5 mm (i.e., assuming the material surrounding the monopole antenna is a material with a relative permittivity of $\varepsilon_r=3$).

As a different hypothetical, say for example, the operating frequency is about 10 GHz. In such a hypothetical, the wavelength of the signals would be about 1.7 cm and a quarter of that wavelength would be about 4.3 mm. Those having ordinary skill in the art will appreciate that the thickness of the layers and the length of the monopole antenna will range based on the operating frequency of the monopole antenna. In some embodiments, the dielectric layers can be either prepreg layers or core dielectric layers depending on the manufacturing preferences associated with a particular module being developed.

In some embodiments, the sixth step 412 in the process comprises forming (i.e., etching and/or patterning) annular ring, one or more annular rings, or other similar pattern, in the outer layers (i.e., through the dielectric material layers) of the module. In some embodiments, each of the annular rings is formed with a diameter larger than the intended diameter for the integrated monopole antenna and can be used for the plating process. Next, in some embodiments, the seventh step 414 in the process comprises forming a hole, or one or more holes, having a location and diameter of the integrated monopole antenna within the annular ring(s). In some embodiments, the hole can be formed by drilling or other suitable methods. Once the hole has been formed in the annular ring, the eighth step 416 in the process comprises plating the drilled hole to form an antenna monopole. In some embodiments, the hole can be plated using procedures known to those having ordinary skill in the art. For example and without limitation, the hole can be plated using an electroless plating process. Once the hole is plated, in some embodiments, the ninth step 418 in the process can comprise filling the drilled and plated hole with a filling material as described above (i.e., underfill). In some embodiments, the process of the present disclosure can comprise a tenth step 420 comprising optionally laminating a dielectric loading layer to the monopole end side of the integrated monopole antenna. However, the tenth step 420 is usually only performed if dielectric loading of the antenna monopole is required. In some embodiments, a reflector is needed for the module, in which case the process of the present disclosure can comprise an eleventh step 422 comprising optionally forming (i.e., drilling) a slot in the outer layers for a reflector to be included. Additionally, in this same vein, a twelfth step 424 comprising optionally plating the reflector in the slot can be performed in order to form the reflector after the slot has been formed (i.e., drilled). In some embodiments, the reflector can be plated using any technique known to those having ordinary skill in the art. For example and without limitation, in some embodiments, the reflector can be plated using edge plating processes.

Once the layers of dielectric material have been finished and the antenna(s) have been formed and plated, in some embodiments, the thirteenth step 426 in the process comprises machining a cavity, or one or more cavities, in the top layer of the laminate (i.e., conductive layers) for integrating an integrated circuit die, or one or more integrated circuit dies, to the module. Once the cavity is machined, those having ordinary skill in the art will appreciate that any number of techniques can be utilized to attach or otherwise bond the integrated circuit die to the module. In some embodiments, for example and without limitation, the integrated circuit die is wire bonded to the module. In such a process, the fourteenth step 428A comprises attaching the integrated circuit die to the machined cavity in the laminate. Next, the fifteenth step 430A in the process comprises wire bonding the integrated circuit die to the module using conductive wires (i.e., short wedge-to-wedge wire bonds where the laminate bond pads and the integrated circuit die pads are at the same level) to connect the laminate bond pads to the integrated circuit die pads. This allows the integrated circuit die to interface with the monopole antenna.

In some other embodiments, the integrated circuit die is casted into or molded together with the module. In such a process, the fourteenth step 428B comprises placing the integrated circuit die on the laminate or in the laminate cavity and casting the die into or molding the die together with the module. Finally, the fifteenth step 430B in the process comprises plating conductive traces between the laminate interconnect traces and the integrated circuit die pads using integrated processes known to those having ordinary skill in the art. In some embodiments, the interconnect traces are on the top layer or surface of the module. In such an embodiment, in some case, one or more other layer of dielectric material can be applied to protect the interconnects and form pads.

More than one antenna can be produced using the above methods. In other words, multiple annular rings can be formed and drilled, and each of those drilled rings can be plated and filled as well. In some embodiments, the method further comprises forming two more additional antenna elements through at least a second and a third of the one or more holes drilled. In such an embodiment, a first monopole antenna element drilled and formed in steps 412 through 418, can be connected to radio circuitry in the one or more integrated circuit dies. The radio circuit can include circuitry configured to tune the monopole antenna to operate at different frequencies or different frequency bands. Additionally, antenna elements formed in the second and third of the holes drilled can be connected to impedance tuning circuitry or switching elements in the one or more integrated circuit dies.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

What is claimed is:

1. A method for fabricating an integrated monopole antenna in a planar laminate module, the method comprising:
   laminating one or more conductive layers to a first dielectric material layer;
   forming one or more holes through at least the first dielectric material layer;
   forming a monopole antenna within at least a first of the one or more holes;
   attaching one or more integrated circuit dies to one of the one or more conductive layers; and
   connecting the one or more integrated circuit dies to the monopole antenna.

2. The method of claim 1 further comprising etching one or more patterns into the one or more conductive layers.

3. The method of claim 1 further comprising laminating one or more outer dielectric material layers onto and around a surface of the one or more conductive layers on the first dielectric material layer.

4. The method of claim 1, wherein forming the one or more holes comprises:
   etching and patterning a top layer of the planar laminate module to form one or more annular rings, each having a diameter that is greater than a diameter of the monopole antenna; and
   drilling a hole through each of the one or more annular rings to a desired depth in the planar laminate module.

5. The method of claim 1, wherein forming the monopole antenna comprises plating an inner surface of the first of the one or more holes.

6. The method of claim 5, wherein the method further comprises filling each of the one or more holes with a filling material.

7. The method of claim 5 further comprising using an electroless plating process for plating the one or more holes.

8. The method of claim 1, wherein a length of the monopole antenna is equal to about one-quarter of a wavelength of a desired operating or resonance frequency of the monopole antenna.

9. The method of claim 1 further comprising positioning a reflector near the monopole antenna, the reflector being configured to reflect radiation emitted from the monopole antenna.

10. The method of claim 9 further comprising drilling a slot configured such that the reflector can be in the slot.

11. The method of claim 1 further comprising machining a cavity in the planar laminate module configured such that the one or more integrated circuit dies can be integrated to the planar laminate module.

12. The method of claim 1 wherein the monopole antenna is connected to radio circuitry in the one or more integrated circuit dies.

13. The method of claim 12 wherein the radio circuitry includes circuitry configured to tune the monopole antenna to operate at different frequencies or different frequency bands.

14. The method of claim 12 further comprising forming one or more additional antenna elements through at least a second of the one or more holes.

15. The method of claim 14 wherein the one or more additional antenna elements are connected to impedance tuning circuitry or switching elements in the one or more integrated circuit dies.

16. A planar laminate integrated circuit module comprising:
   one or more dielectric material layers;
   one or more integrated circuit die on a surface of or attached to the planar laminate integrated circuit module; and
   an integrated monopole antenna interfaced with the one or more integrated circuit dies;
   wherein the integrated monopole antenna is formed within a through hole of the planar laminate integrated circuit module, the through hole being formed through at least one of the one or more dielectric material layers.

17. The planar laminate integrated circuit module of claim 16 wherein pads of the one or more integrated circuit dies are wire bonded to pads of the surface of the planar laminate integrated circuit module.

18. The planar laminate integrated circuit module of claim 16 wherein an inner surface of the through hole is plated.

19. The planar laminate integrated circuit module of claim 18 wherein the through hole is plated using electroless plating.

20. The planar laminate integrated circuit module of claim 19 wherein the through hole comprises a filling material.

21. The planar laminate integrated circuit module of claim 16 wherein the integrated monopole antenna has a dimension that is equal to approximately one-quarter wavelength of an operating or resonating frequency of the integrated monopole antenna.

22. The planar laminate integrated circuit module of claim 16 wherein the integrated monopole antenna is connected to radio circuitry in one of the one or more integrated circuit dies.

23. The planar laminate integrated circuit module of claim 22 wherein the radio circuitry comprises circuitry configured to tune the monopole antenna to operate at different frequencies or different frequency bands.

24. The planar laminate integrated circuit module of claim 22 further comprising one or more additional integrated antenna elements formed in respective through holes of the planar laminate integrated circuit module.

25. The planar laminate integrated circuit module of claim 24 wherein the one or more additional integrated antenna elements are connected to impedance tuning circuitry or switching elements in one of the one or more integrated circuit dies.

26. The planar laminate integrated circuit module of claim 16 further comprising one or more reflector configured to reflect radiation from the integrated monopole antenna away from the one or more reflector.

* * * * *